C. F. STROHM.
RESILIENT TIRE.
APPLICATION FILED OCT. 21, 1911.

1,082,453.

Patented Dec. 23, 1913.

2 SHEETS—SHEET 1.

Witnesses
E. A. Parkhurst
John L. Bottenfield.

C. F. Strohm
Inventor

By John S. Barker
his Attorney

UNITED STATES PATENT OFFICE.

CHARLES F. STROHM, OF CARTHAGE, MISSOURI.

RESILIENT TIRE.

1,082,453. Specification of Letters Patent. Patented Dec. 23, 1913.

Application filed October 21, 1911. Serial No. 655,966.

*To all whom it may concern:*

Be it known that I, CHARLES F. STROHM, a citizen of the United States, residing in the city of Carthage, county of Jasper, and State of Missouri, have invented certain new and useful Improvements in Resilient Tires, of which the following is a specification.

My invention relates to resilient tires for automobiles and other vehicles, and more particularly to tires in which an outer elastic or resilient tire is supported by or upon a pneumatic cushion concentric therewith, these being supported upon the rim of the wheel.

The invention has for its object to improve a tire of this type in respects and manner to be pointed out.

Figure 1:
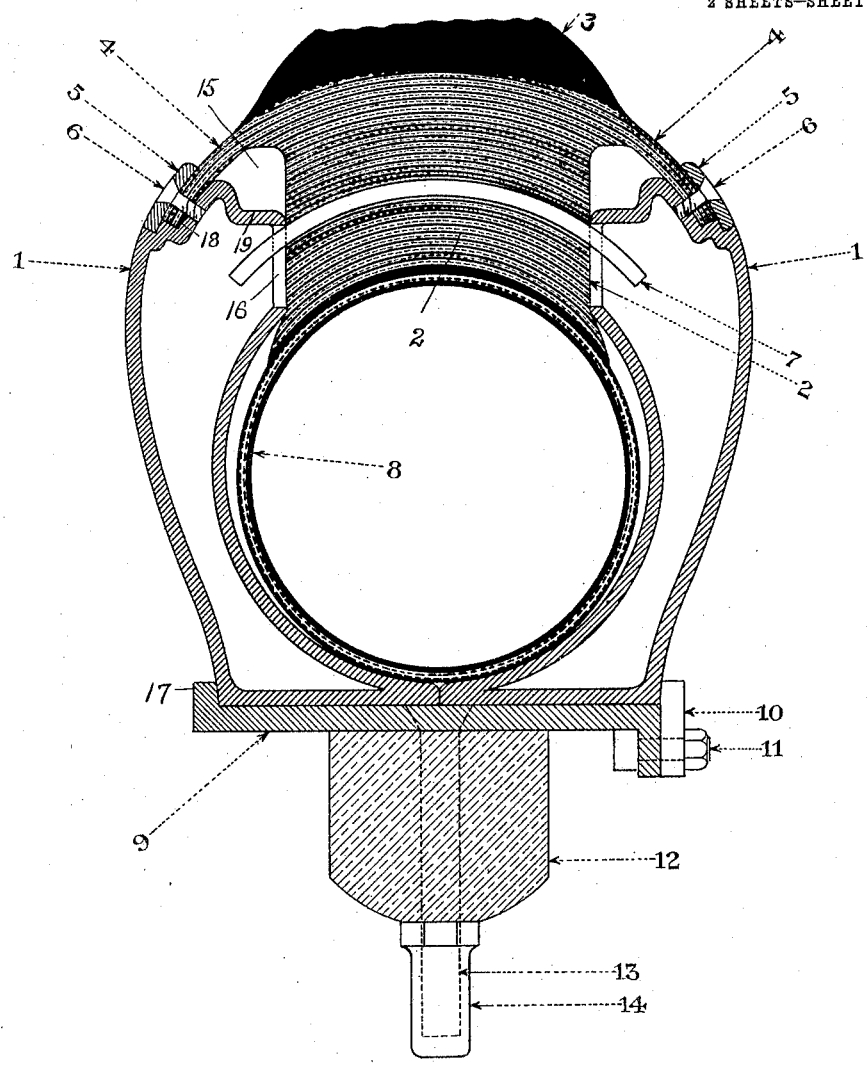
Figure 2:
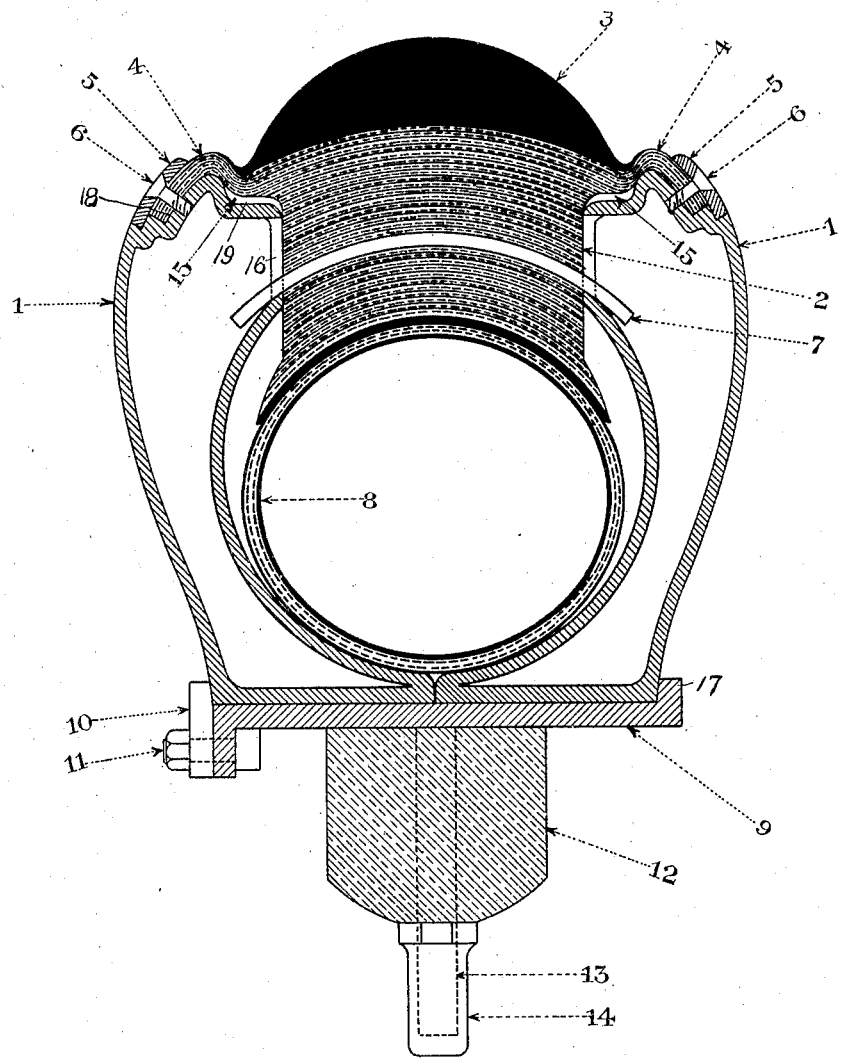

In the accompanying drawings, Figure 1 is a cross sectional view of a tire embodying my improvements, the inner tube or pneumatic cushion being inflated. Fig. 2 is a similar view showing the inner tube partly deflated.

In the drawings, 12 designates the felly of a wheel which may be of any usual or approved construction. Upon this is supported a rim 9 preferably of metal and secured to the felly by bolts 13 and nuts 14. The tire is held in place by a pair of supporting and retaining metal flanges 1, 1, and consist of an inner pneumatic tube or cushion 8, and an annular tread or bearing portion, 2, 3, which is preferably more or less elastic. The tire-retaining flanges are preferably of hollow metal construction, to secure strength and lightness, and are supported directly upon the rim 9 which is preferably formed along one edge with a retaining flange 17 against which one retaining flange rests, the opposite retaining flange being held in place by clips 10 and nuts and bolts 11.

The outer or cushion portion of the tire preferably consists of a tread of rubber or rubber composition, 3, and a backing of rubber and fabric, 2, which is of considerable diametric thickness. The cushion tire is provided along each edge and intermediate between its outer tread surface and its inner surface with strips, 4, 4, they preferably being of the same composition as the reinforced or strengthened part 2 of the tire. The inner face of the cushion portion of the tire rests upon the inner tube or pneumatic cushion 8 which is seated in an annular chamber, formed to receive it by the shape of the retaining flanges, 1, 1, when secured in place upon the wheel. The outer portions of the flanges 1 are spaced apart a distance to accommodate between them the inner portion 2 of the cushion tire. The strips, 4, 4, of the tire are carried outward and lie in seats 18 provided therefor in the outer edges of the flanges, where they are confined by the clamp rings 5 and retaining screws 6.

When a tire such as described is secured in place upon the wheel flange with the inner tube inflated, the parts occupy the position shown in Fig. 1, the cushion portion of the tire being forced outward by the inner tube, the strips 4 being thus put under some tension. Under these conditions, there are annular spaces, designated 15, between the reinforced body 2 of the cushion tire, the strips 4 thereof, and the outer ends or edges of the retaining flanges, which latter are formed into seats 19. Should the inner tube become compressed, as when the wheel passes over some obstruction, or partly deflated, the parts of the tire assume the positions indicated in Fig. 2, when, as may be seen, the cushion tire is forced inward between the flanges 1, 1, until it rests upon the seats 19, the strips 4 meanwhile flexing to permit this change in the position of the cushion tire. It will thus be seen that when the cushion tire is forced inward to the extent indicated in Fig. 2, it rests upon and receives support from the flanges 1, 1, upon which it rests at 19, 19, under which conditions, if further forced inward or compressed, the tire acts only as a cushion tire. In order to give a further support to the cushion tire, as well as to prevent its circumferential creeping or movement about the rim of the wheel, I embed in the body 2 of the cushion tire a series of resilient metal bars 7, adapted to yield under pressure and curved so as to be approximately concentric with the inner tube when fully inflated, and having their ends extending outward beyond the body of the cushion tire. The end portions of the arched spring bars 7 extend through slots 16 formed in those parts of the flange 1 between which is situated the body 2 of the cushion tire. These bars by their engagement with the retaining flanges serve, as stated, to prevent creeping of the tire. They also operate to prevent the cushion tire being forced outward to an undesirable degree by the inflation of the inner tube, and thus relieve the strips 4 from being strained. When the parts of the tire assume the positions indicated in Fig. 2, that is, when the cushion tire is forced inward, the bars 7 come into engagement with the flanges 1, as they reach the lower ends of the slots 16, and thus form supplemental yielding or elastic supports for the cushion tire, which extend across from edge to edge thereof. Thus when the inner tube is deflated, the cushion tire acts in a satisfactory manner, being supported by the retaining flanges and bars 7 entirely across the tire, that is, from edge to edge, while it is also supported at its edges and but relatively a short distance from the tread by resting upon the seats 19 formed in the outer edges of the flange.

The strips 4 are flexible so as to permit free movements of the cushion tire; and they serve under all circumstances to securely close the outer openings into the space between the retaining flanges so that the body portion 2 of the cushion tire and the inner tube or pneumatic cushion are protected from dirt and water and the deterioration that is incident to the presence of these.

It will thus be seen that the tire which I have described and illustrated possesses practically all the advantages incident severally to a pneumatic tire and also to a cushion tire without the defects which are incident to either of these forms of tires. When the inner tube is inflated the cushion tire acts as an armor therefor and effectually prevents puncture thereof. When the inner tube is deflated or for other reasons the cushion tire is caused to occupy the position indicated in Fig. 2, it is supported, as will be seen, directly back of the tread by the bars 7, as well as along its edges, by the engagement of the tire with the seats 19 upon the flanges. Such supporting of the outer or cushion tire is entirely independent of the pneumatic or inner tube.

The body portion 2 of the cushion tire has parallel sides which engage with the parallel faces 20 of the retaining flanges. This arrangement permits free radial movements of the cushion tire while at the same time affording good lateral support thereto under all conditions of use.

What I claim is:—

1. The combination with a wheel rim, of a cushion tire therefor, an inflatable pneumatic tube interposed between the tire and the rim, upon which the former rests, retaining flanges for holding in place the pneumatic tube and the cushion tire, and yielding, resilient bars embedded in the body of the cushion tire and extending beyond the edges thereof and arranged to engage with the retaining flanges when the pneumatic tube is under unusual compression and support it independently of the pneumatic tube.

2. The combination with a wheel rim, of a cushion tire therefor, having a tread and a body back of the tread, a resilient support for the tire interposed between it and the wheel rim, retaining flanges for holding in place upon the wheel the said tire and resilient support, the flanges being formed with faces between which the body of the tire is supported and free to move radially, there being formed slots in the said faces of the flanges and arched spring bars seated in the body of the tire and having their ends lying in the said slots formed in the retaining flanges, substantially as and for the purposes set forth.

CHARLES F. STROHM.

Witnesses:
F. L. HULL,
C. B. STICKNEY.

---

Copies of this patent may be obtained for five cents each, by addressing the "Commissioner of Patents, Washington, D. C."